Sept. 6, 1960

A. WEISS 2,951,626

BOX CONSTRUCTION

Filed Feb. 8, 1956

INVENTOR.
ADOLPH WEISS
BY
Norman Blumenkopf
HIS ATTORNEY.

Sept. 6, 1960      A. WEISS      2,951,626
BOX CONSTRUCTION

Filed Feb. 8, 1956      5 Sheets-Sheet 2

INVENTOR.
ADOLPH WEISS
BY Norman Blumenkopf
HIS ATTORNEY.

Sept. 6, 1960 A. WEISS 2,951,626
BOX CONSTRUCTION
Filed Feb. 8, 1956 5 Sheets-Sheet 3

INVENTOR.
ADOLPH WEISS
BY Norman Blumenkopf
HIS ATTORNEY.

Sept. 6, 1960
A. WEISS
2,951,626
BOX CONSTRUCTION
Filed Feb. 8, 1956
5 Sheets-Sheet 5
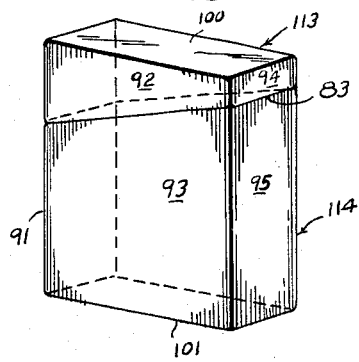
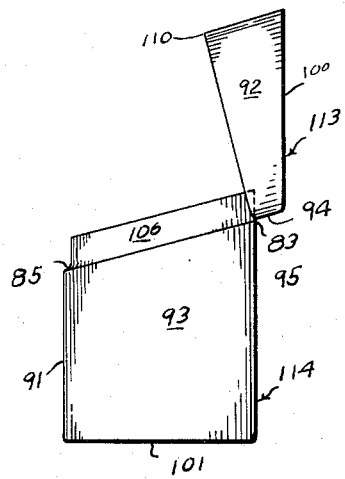
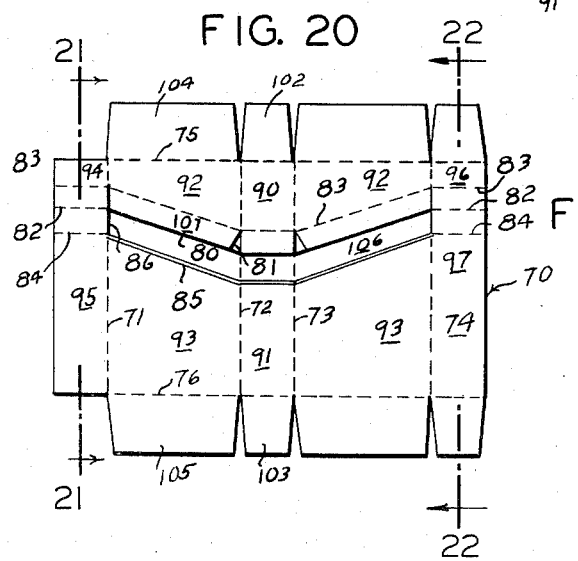
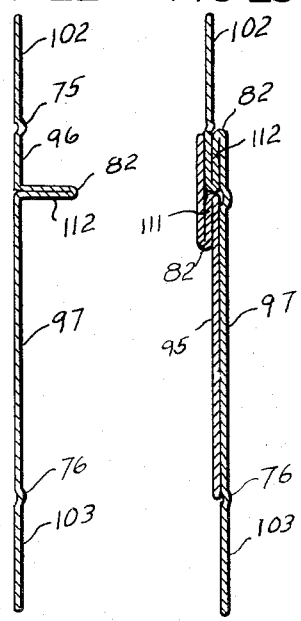
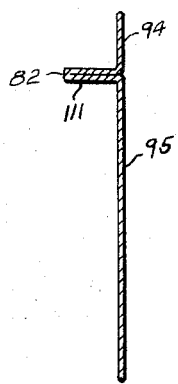
INVENTOR.
ADOLPH WEISS
BY
Norman Blumenkopf
HIS ATTORNEY.

United States Patent Office 2,951,626
Patented Sept. 6, 1960

2,951,626

BOX CONSTRUCTION

Adolph Weiss, 2823 Ave. I, Brooklyn, N.Y.

Filed Feb. 8, 1956, Ser. No. 564,260

8 Claims. (Cl. 229—44)

This invention relates to paper boxes and relates more particularly to a novel box having an interfitting engagement between the box and a hinged cover. Boxes with hinged covers are generally of two types. In one type the box and cover are of the same dimensions in the horizontal plane and, when closed, they engage each other in abutting relationship. In the second type the cover encloses a portion of the outer faces of the upper wall section of the box.

A common type of box represents a combination of the two in that the box and hinged cover are of the same horizontal dimensions and a separately formed internal sleeve or neck wall is secured within the box and the neck wall is enclosed by the cover when the latter is closed.

An important object of the present invention is to provide a box which may be made from a single blank and wherein the neck wall is formed integrally with the box portion, said neck wall being recessed inwardly so that the outer faces of its front and side walls are on the same plane as the corresponding walls of the box.

Another object of the invention is to provide a box of this character wherein substantially all of the rectangular blank is employed, thus reducing waste to a minimum.

A further object of the invention is the provision of a box with attached hinged cover wherein the lower edge of the front and side walls of the covers are folded upwardly and secured, thus providing a smooth, rounded edge as distinguished from the rough edge of the covers of the prior art.

Another object of the invention is to provide a novel box and hinged cover wherein the upper section of the blank is formed with a horizontal cut line over the major portion of its width, leaving, however, the end sections attached, and the upper section is telescoped downwardly to form the cover which encloses the recessed neck wall previously referred to.

In the boxes of the prior art any exterior printed design which extended across said meeting line from the main body portion to the cover portion lost its continuity when the cover was opened. This invention proposes a design continuity which prevails in the open or in the closed position of the lid member.

The boxes of the present invention are also unique in that they may be made on existing automatic machines with only minor adjustment of the mechanism.

Figure 11:
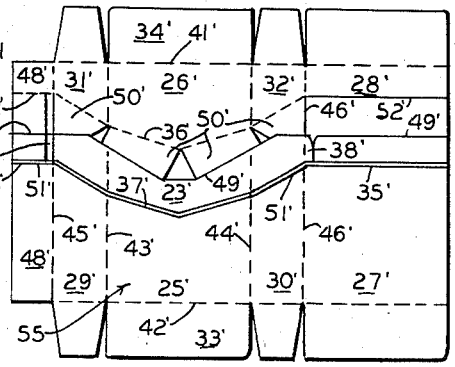
Fig. 11 shows an alternate construction of the blank illustrated in Fig. 4.
Figure 12:
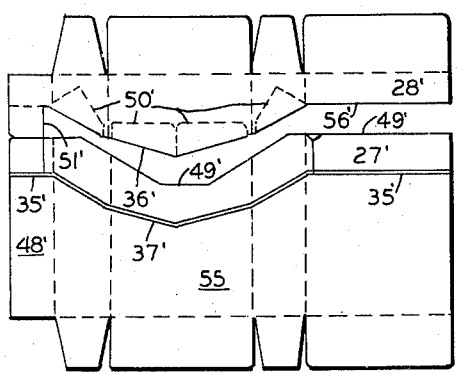
Fig. 12 illustrates the second step in the fabrication of the blank of Fig. 11.
Figure 13:
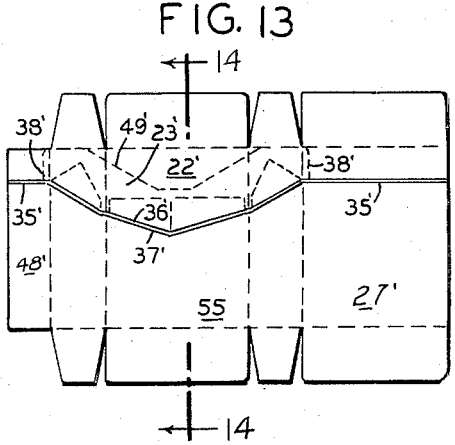

Fig. 13 indicates the third step in the manufacture of the blank in Fig. 11.

Figure 14:
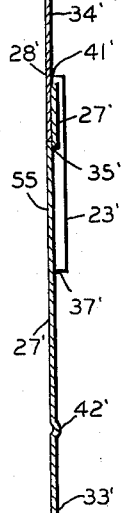

Fig. 14 is a section taken on line 14—14 of Fig. 13.

Figure 15:
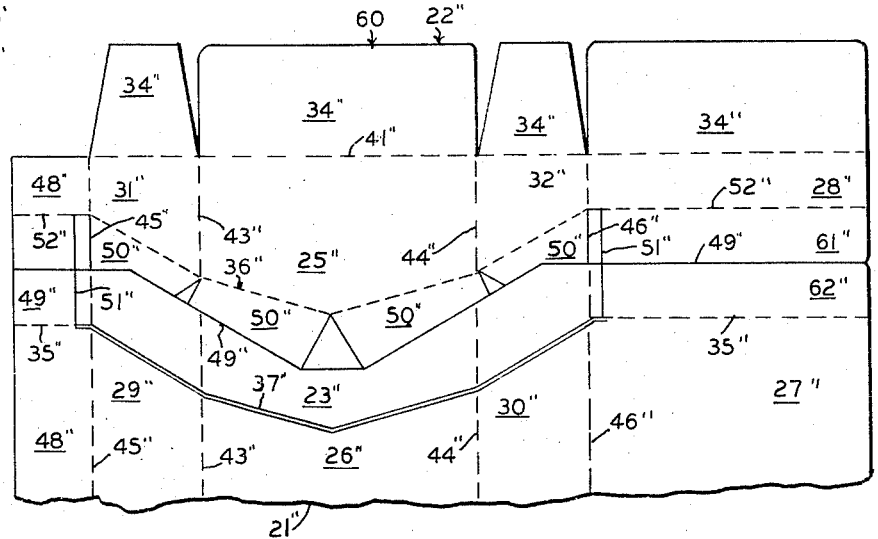

Fig. 15 is a plan view of a second modified form of blank.

Figure 16:
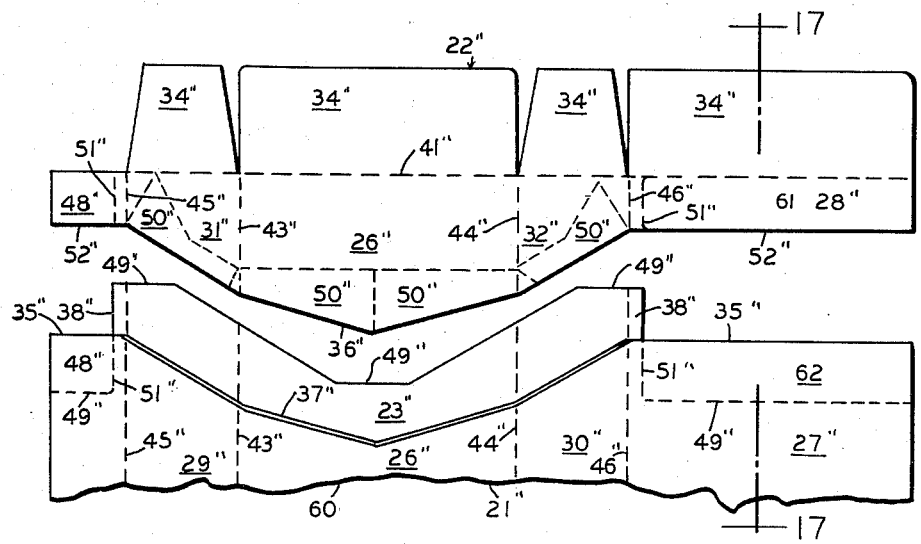

Fig. 16 illustrates the second step in the fabrication of the blank of Fig. 15.

Figure 17:
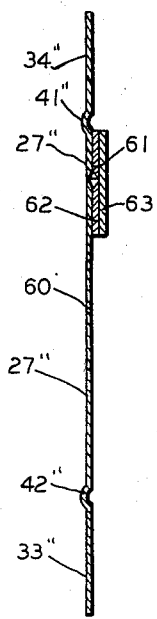

Fig. 17 is a section taken on line 17—17 of Fig. 16.

Fig. 18 is a perspective view of a modified box wherein the hinge line extends across a narrow rather than wide panel.

Fig. 19 is a side elevation showing the box in open position.

Fig. 20 is a plan view of the blank.

Fig. 21 is a section taken on line 21—21 of Fig. 20.

Fig. 22 is a section taken on line 22—22 of Fig. 20.

Fig. 23 is a section taken through the rear wall of the finished box.

Referring now more particularly to the drawings, the box 20 includes a relatively deep receptacle 21 and a relatively shallow hinged cover 22 which, when in closed position, encloses the upper sections of the front and side walls of the receptacle and this overlap forms a relatively air-tight closure. The rear wall of the cover is an upward continuation of the rear wall of the receptacle and these walls lie on the same plane and are joined by a crease line forming a hinge element.

When the receptacle is closed the outer faces of the front and side walls of both receptacle and cover also lie on the same plane and in order to accomplish this result the upper sections of the front and side walls of the receptacle are recessed inwardly a distance substantially equal to or slightly greater than the thickness of the walls of the cover. This forms what will be termed a neck wall 23 which is enclosed by the cover when the latter is in closed position.

Figure 10:
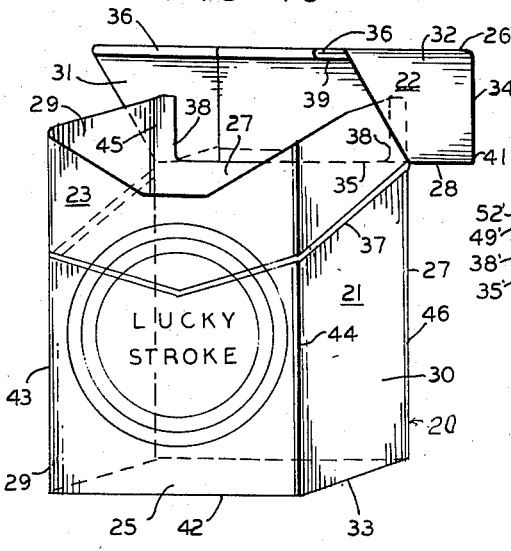
Fig. 10 shows the box of Fig. 1 with the cover in open position.

Receptacle and cover include front wall portions 25 and 26, rear wall panels 27 and 28, side wall panels 29 and 30, 31 and 32, a bottom wall 33 and a top wall 34. A crease line 35 forming the hinge element between cover and receptacle is located somewhat below top wall 34. The lower edges 36 of the cover have the contour shown in Fig. 10. The lower edges of the side walls of the cover are inclined downwardly and the lower edge of its front wall is also inclined downwardly to the center.

To form the neck wall 23 the front and side walls of the receptacle are bent rearwardly and then upwardly to form a continuous narrow horizontal shelf 37 which has a matching contour with lower edge 36 and at the rear of the side walls edge 36 meets shelf 37. These lines coincide when the cover is closed, and the lower edges of the cover abut against the shelf 37. The width of shelf 37 is such as to cause the outer faces of receptacle and cover to lie on the same plane.

The upper edge of the wall is recessed to provide a finger opening at approximately the same height as the hinge line 35 to afford free access to the contents of the box 20 when the cover is opened. The neck wall 23 extending above shelf line 37 is concealed by the cover when in its closed position. The parts are proportioned so as to provide for slight frictional engagement against the corresponding wall portions of the cover member in its closed position to prevent free movement of the latter and thereby serve to secure it in its closed position.

Adjacent to the corners formed by the meeting lines of the side and rear walls of the neck wall 23 the said rear wall is cut downwardly to provide abutments 38. The remainder of the rear wall 27 is adhesively joined with the corresponding wall section 28 of the cover member. The object of abutments 38 is to serve as a protection and a guide to prevent the wall panels 31 and 32 from engaging the side portions of the neck wall during their pivotal movement and also to rigidify the neck wall and to increase this frictional engagement of the cover when closed.

The end portions of the wall panels 26, 31 and 32 extend beyond the lower edge 36 of the front wall of the cover. These extending portions are folded around said edge line into a double ply and are inwardly secured to provide a smooth edge and to reinforce said panels.

The exterior faces of the box 20 would normally be imprinted with a design and a trademark. It is often necessary to carry a design across the meeting line of the members 21 and 22. To enhance the illusion of continuity the corresponding portions of this design shall be positioned in a registered relation with each other to give an unbroken effect. It is also desirable to duplicate the design portions carried by the lid member on the shelf 37 and on the neck wall 23 in registered relation with each other. In this manner the continuity of the design shall be preserved whether the cover is open or closed. In boxes of the prior art where the neck piece was a separate and attached portion this feature, although desirable, would represent a genuine fabrication problem which is avoided in this combination by reason of the fact that the neck wall 23 is a continuation of the front and side walls.

Figure 4:
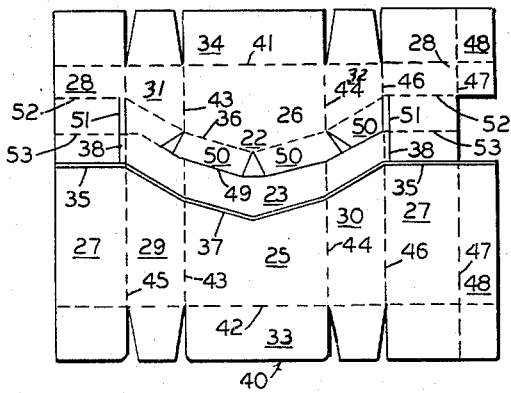
Fig. 4 is a plan view of the blank for the box shown in Fig. 1.

The box 20 is fabricated from blank 40 shown in Fig. 4 formed from a rectangular sheet of a boxboard material. In accordance with common practice blank 40 is first printed on its outer face and it is then creased along certain lines and cut along others to form the several wall panels.

Crease lines 41 and 42, respectively, constitute the fold lines for the top and bottom wall panels 33 and 34. Central vertical crease lines 43 and 44 are the fold lines for the front panels 25 and 26 and the adjacent side wall panels 29—30 and 31—32. The parallel outer crease lines 45 and 46 represent the fold lines to form the corner between the aforesaid side wall panels and the contiguous rear wall panels 27 and 28. The vertical line 47 represents an indentation in the longer half of the rear walls 27 and 28. The additional width 48 constitutes a glue lap by which the opposing rear walls are joined. Below the crease line 41 is a diagonal crease line 36 extending between the vertical lines 45 and 46, and intersecting the crease lines 43 and 44.

Below the edge 36 is the somewhat parallel cut line 49 which serves as the division line between the members 21 and 22. The space between the aforesaid lines 36 and 49 is notched to provide meeting lines for the glue laps 50 which are formed by turning the sections upwardly.

Adjacent to the crease lines 45 and 46 and within the wall panels 28 are cut lines 51 which extend between the crease line 36, through the cut line 49 and below the latter. The area bordered by the lines 36, 45, 46, 51 and 49 are waste portions to be discarded. The area between the lines 51 and the crease lines 45 and 46 and below the cut line 49 constitute the aforesaid abutments 38 of the box 20.

In the cover member the crease line 52 forming a continuation of crease line 36 running across the rear wall portions 28 is parallel with the crease line 41. Thus the corresponding shelf line 37 running through the rear wall panels 27 is parallel to the line 52 in said cover panels and is indicated as fold line 35. The connecting wall portions lying between the lines 51, 52 and 35 include the crease line 53 parallel to the line 52.

The glue lap 48 is notched on the lines 35, 47 and 52 and the material of that area represents a waste piece to be discarded.

Figure 5:
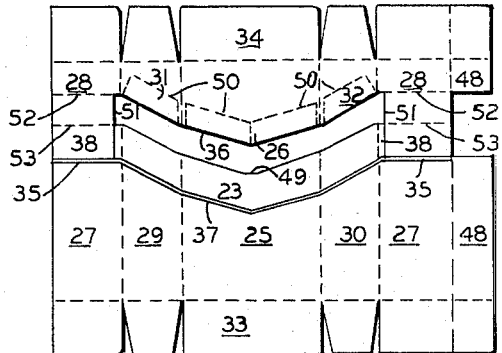
Fig. 5 shows the succeeding step in the manufacture of the blank seen in Fig. 4.

The next step in the processing of blank 40 as shown in Fig. 5 consists in folding the tabs 50 backwardly around the crease line 36 and securing them to the back of the sheet, forming a double ply.

Figure 6:
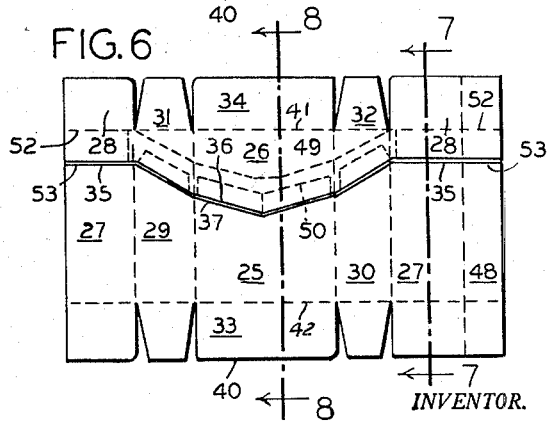
Fig. 6 shows the third stage of the fabrication of said blank of Fig. 4.

Referring to Fig. 6 in the next operational step the rear wall portions extending between the fold lines 52 and 35 constituting the connecting sections between the members 21 and 22 and which are divided by the crease line 53 are folded into a double ply on said line 53 and are next folded on the line 52 to form a zig-zag folded triple ply. The said plys are then secured to each other and against the wall section 28.

By means of these folds the member 21 is lowered from the position shown in Fig. 5 in such manner that the fold line 36 moves into an abutting engagement with the shelf line 37. Furthermore, it will be noted that in this position the printed design on the lid member 21 and the corresponding design portion on the underlying neck wall 23 are also brought into registry with each other. By virtue of the dimensional disposition of the crease lines 52 and 53 in relation to the location of lines 36 and 37, said printed designs shall be coordinated to assure such registration.

Figure 7:
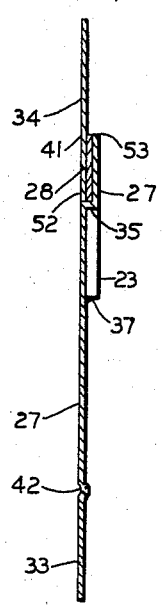
Fig. 7 is a section taken on line 7—7 of Fig. 6.
Figure 8:
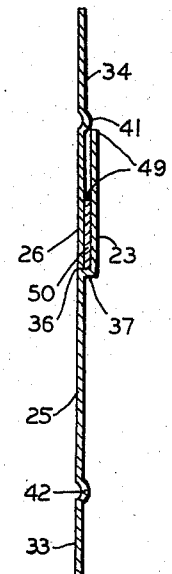
Fig. 8 is a section taken on line 8—8 of Fig. 6.

In this position, furthermore, the wall sections 26, 31 and 32 of the cover member are in superimposed relation over the neck wall 23 and the outer faces of the exposed sections of both members are brought into a level plane (Figs. 7 and 8).

Figure 9:
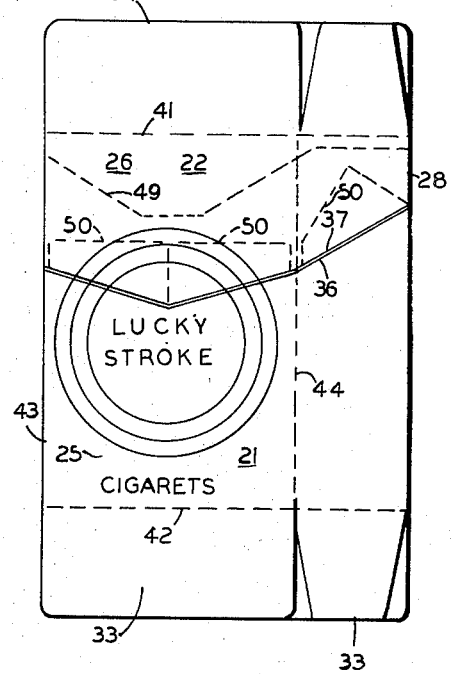
Fig. 9 illustrates the fourth step in the fabrication of the blanks shown in Figs. 6 and 11.

Referring to Fig. 9, during the next operational step the blank of Fig. 6 is folded on the vertical crease lines 43 and 46, thus bringing the opposite end portions of the rear wall members 27 and 28 into juxtaposed relation with the glue lap 48 below the shorter side of the said panels. The said glue lap is next adhesively secured with said wall member and the blank 40 now constitutes a rectangular tube which may be collapsed in the form shown in Fig. 9 for easier storage and shipment. It will be noted that the notched out portion of the glue lap 48 provides clearance for the superimposed portion of the said three-ply joint which otherwise would be built up into a six-ply thickness.

During the final processing of the blank 40 the tubular blank is expanded into the rectangular shape to close the top and the bottom walls 33 and 34, respectively. It will be noted that these wall portions extend from their corresponding front, rear and side wall portions beyond the crease lines 41 and 42, and that they are sectioned to coincide with said wall panels forming individual tabs. During the final operation these tabs are folded and placed over one another and are finally adhesively secured in that position. The box 20 is now ready for use.

The packaging of the contents into the box 20 may be done manually or mechanically. In the first instance the box 20 would be opened by turning the cover 22 around the hinge line 35 (Fig. 10), thus exposing the receptacle chamber which is then filled with said contents. The same procedure may also be used for mechanical packing.

For machine packaging it may be more convenient, however, to use the blank of Fig. 6, place the contents onto the flat blank and form the tube around the contents. It may also be preferable to use the blank in the collapsed tubular shape of Fig. 9, expand the tube and insert the contents through one end and close the end tabs thereafter. The selection of either method of packaging is not a part of this invention and the various forms of the blank 40 offer a considerable flexibility of selection, particularly in the case where it may be desirable to adapt an existing packaging machine for the box 20 which originally was intended for a container of a different construction. Thus the most expedient form of blank can be selected to avoid extensive alterations in the existing machinery.

A modified box formed by blank 55 in Figs. 11-14 will stack somewhat more evenly than the box just described. It also eliminates the lap at the middle of the rear wall which may be objectionable so far as printed indicia is concerned. In describing this form of the invention the same reference characters have been used for blank 55 as for blank 40 except that a prime (′) has been added.

Referring to Fig. 11, the modified blank 55 is provided with horizontal crease lines 41′ and 42′. Except for changes in relative location it also contains the vertical crease lines 43′, 44′, 45′ and 46′ but the indentation line 47 is omitted. The glue lap 48′ now extends from the side panels 29′ and 31 past the crease line 45′.

The diagonal crease line 36′ and its mating shelf line 37′, neck wall portion 23′, the reinforcing tabs 50′ and abutments 38′ are practically identical with their counterparts of blank 40. However the cut line 49′ extends now across the entire width of the blank 55, thus physically separating members 21′ and 22′ bodily. Furthermore it will be noted that in the blank 55 the rear wall panels 27′ and 28′ are now of the full width. The line 52′ in the said rear panels is now cut through. Thus the area bordering between the lines 49′, 46′ and 52′ is notched out and discarded. The crease line 52′ on the glue lap 48′ is retained, however.

In the next operational step (Fig. 12) the reinforcing tabs 50 are folded and secured similar to blank 40.

During the following operational step (Fig. 13) the members 21′ and 22′ are now placed in superposed registered relation to bring folded edges 36′ into abutting engagement with the shelf line 37′ and also to register the superposed printed text of the corresponding wall panels of the member 22′ and of the neck wall 23′. In that position the respective superimposed portions of the glue lap 48′ and of the rear wall panels 27′ and 28′ are adhesively secured to each other. In that condition the blank 55 resembles the blank 40 except that the joint of the aforesaid panels is constituted of two plys instead of three plys and that the rear wall panels are not interrupted in width (Figs. 13 and 14). In vertical section (Fig. 8), however, the blanks are quite similar.

During the following operation the glue lap 48′ is now joined with the opposite rear wall portions of 27′ and 28′ but otherwise the blanks 40 and 55 are at this state indistinguishable (see Fig. 9). The finishing operations for both blanks are identical.

Referring to Figs. 4 and 7 and 11 and 14, respectively, it shall be noted that in the blanks 40 and 55 the rear wall panels 27 and 28 and 27′ and 28′, respectively, comprise a different number of plys at the opposite sides of the hinge line 35 and 35′. Thus the blank 40 contains three plys on one side and single ply on the other side. The blank 55 has two plys on one side and a single ply on the other side. The differences of thickness at these wall portions may be objectionable and consequently I provide a second modified blank, 60, to remedy such an objection.

Comparing Figs. 11 and 15 relating to blanks 55 and 60, respectively, it will be noted that in Fig. 11 the blank 55 was bisected by the cut line 49′ in such manner that the rear wall portion bordering on the lines 52′, 46′ and 49′, and which is identified in Fig. 15 as portion 61″, is discarded in the said blank 55 and the cover member 22″ is joined by its rear panel 28″ to the panel 27″ by aligning the cut edge 52″ with the crease line 35″ and thus forms the hinge line 35″. The blank 60 differs to the extent that the portion 61″ is retained and inwardly folded on a crease line 52″ and adhesively secured to the back of panel 28″ serving as a body reinforcement to said panel similar to the tabs 50″. The adjacent wall portion of panel 27″ of member 21″ bordering on the lines 49″, 51″ and 35″, to be designated herewith as the portion 62″, is also folded backward on crease line 35″ and adhesively joined on the back of panel 27″. In a similar manner the glue tabs 48″ are also folded inwardly and secured on fold lines 52″ and 35″ (Fig. 16) and secured.

When the member 22″ is superimposed over the depressed neck wall 23″ the folded edges of 52″ and 35″ are brought into an abutting alignment and the rear walls 27″ and 28″ and the respective glue laps are then joined by a hinge strip 63 in an adhesive manner. The hinge strip 63 shall be as wide as the combined width of portions 61 and 62 and as long as the width of the rear walls 27″, 28″ and the glue lap 48″ (Fig. 17). The material for strip 63 may be cloth, paper or a plastic film or similar materials. A material offering the minimum thickness is preferable. The strip 63 may be applied interiorly or exteriorly. The meeting line 35″ of said rear wall panels shall constitute the hinge line 35″ for the box 20″.

The strip 63 may also be made of an elastic material such as rubber or an elastic plastic film. In that event the mounting of strip 63 shall provide for a moderate tension between the adjoining fold lines 52″ and 35″ which will be increased when the hinge member 22″ is turned outwards. The said tension will tend to pull the lid 22″ backwards to its normal closed position and thus provide a self closing lid. This feature may be regarded as a desirable improvement for a box of this type.

The hinge construction of blank 60 provides for a uniform thickness of the rear wall panels 27″ and 28″. The panels 62 and 61 may also be notched to provide clearance for the underlying glue laps when the same are joined with the aforesaid rear wall panels.

Another form of my box having advantages not present in the aforementioned modifications is shown in Figs. 18 through 23. In this form the box has its cover hinged along the narrow panel rather than along the wide panel. This has several practical advantages. By this construction it is possible, with a simple motion, to remove one by one the contents of the box without exposing the remaining contents. This is achieved by virtue of the fact that the contents of the box can be exposed at the narrow end opposite the hinged panel, enabling one to remove the contents through a smaller opening than is the case when the exposure is made along the wider panel. A further advantage of this modification lies in the strengthened hinge construction achieved through the cooperative effect of double plys of sheet material on each side of the hinge line.

This modified box is formed from a blank 70 shown in Fig. 20 which is generally rectangular in shape and is formed with vertical crease lines 71, 72, 73 and 74 and two horizontal crease lines 75 and 76. The blank is cut generally transversely along line 80, and on each side of crease lines 72 and 73 the blank is notched as shown at 81. In addition to the foregoing transverse crease lines, the blank is creased along lines 82, forming a continuation of the cut line, line 83 which also extends across the blank parallel to cut line 80, and line 84 which extends from vertical crease lines 71 and 74 outwardly to the ends of the blank. A rearwardly extending shelf is formed along line 85 forming a continuation of crease line 84 and being parallel to cut line 80. Finally the blank is cut along lines 86 which coincide with fold lines 71 and 74 between horizontal crease lines 83 and 84.

These cut lines and crease lines divide the blank into upper and lower front walls 90 and 91, upper and lower side walls 92 and 93 and upper and lower rear walls 94 and 95, one side of the blank, and 96 and 97 on the other side of the blank.

Top and bottom walls 100 and 101 are formed by tabs 102 and 103 formed integrally with the narrower front and rear walls and 104 and 105 formed on the side walls. The portions of those portions of walls 93, 91 and 92 lying above the shelf line 85 form the recessed neck wall 106. The depth of shelf line 85 is equal substantially to double the thickness of the paper in the blank so that when the cover is in closed position in the assembled box the outer faces of the front and side walls are on substantially the same plane.

The first step in the fabrication of the box is to fold sections 107 of front and side walls 90 and 92 lying below crease line 83 upwardly and then glue them in place to form a smooth rounded edge 110. The upper section of the rear wall portions of the blank is now moved downwardly by folding the portions at the left along crease line 82 (Fig. 21) forming double thickness tabs 111 and doing the same with the portions at the right (Fig. 22) forming double folded tabs 112. Tab 111 is now folded downwardly and tab 112 is folded upwardly and the rear walls 95 and 97 adhered together (Fig. 23).

If the box is to be shipped flat prior to filling, it may be collapsed to a position similar to that shown in Fig. 9. When the box is to be filled the tabs 102, 103, 104 and 105 forming the top and bottom walls are folded inwardly and glued.

Figure 1:
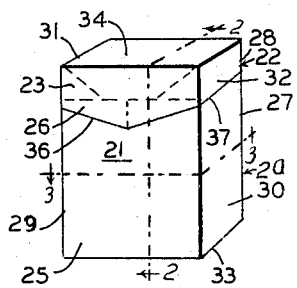
Fig. 1 is a perspective view of a box embodying the present invention and showing the cover in closed position.
Figure 2:
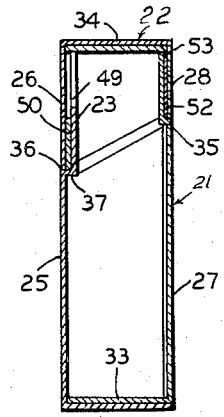
Fig. 2 is a vertical section taken on line 2—2 of Fig. 1.
Figure 3:
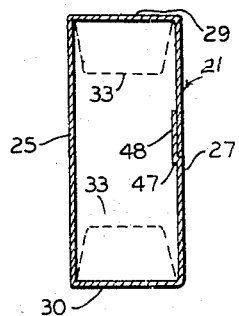
Fig. 3 is a horizontal section taken on line 3—3 of Fig. 1.

The cover section 113 is joined to the box section 114 along crease line 83 and the box when open has the effect of providing greater access to the contents than does the box of Fig. 1 with its hinge line extending across the wide panel, as described above.

It will also be noted that in this modification the hinge line is reinforced on either side thereof by 4 plys of material, thereby providing a hinge construction of outstanding and superior durability.

The blanks 40, 55, 60 and 70 may be furnished to the packaging machine either in the flat state as shown in Fig. 6, or in the tubular state as shown in Fig. 9. To complete the box the packaging machine would be required to apply the necessary adhesive films for the union of the glue laps, e.g., 48, 33 and 34, as is the case in Fig. 6. This is the conventional method in current practice for folding boxes as the box may be classified. It shall also be noted that the cigarette industry which now employs the aforesaid soft pouch package has large investments in the packaging machines for making said pouch containers. Thus the conversion of such machines becomes a major issue when the adoption of the improved packages 20, 30 and 115 is contemplated. Even when this issue does not exist it would be a very desirable improvement from the viewpoint of the operation and of the maintenance of such packaging machines if the glue applicators were entirely eliminated. Furthermore, such applicators apply a wet film of adhesives which must be dehydrated before they reach the state of effective adhesiveness and consequently the packaging machine must comprise long setting tracks which keep the glued tabs under pressure during the time of setting of the adhesives.

To alleviate these conditions and thereby to simplify the problem of conversion and of continuous operation I propose to pre-apply the required adhesive films for the union of the glue laps 48, 33 and 34 (for box 20) as the requirements may be in the form of thermoplastic, dehydrated or pressure sensitive type of adhesives. These types of adhesives are applied in a wet state and are next treated to be non-adhesive in character until they are either reactivated by heat or moisture or, in the case of pressure sensitive adhesives, they are united under pressure with another mating adhesive film. Adhesives of these types are well known in the art and require no further description.

One of the principal uses of the box of the present invention would be as a container for cigarettes or cigars. It is well known that the tobacco of these items requires the retainment of a controlled volume of moisture for the preservation of its flavor between the time of packaging and when the package reaches the consumer. Consequently the soft pouch package which is most predominantly used in the current art comprises a foil backed wrapper as the initial container for the cigarettes. Next, a printed paper wrapper surrounds the foil wrapper. Next, a cellophane wrapper is placed over the previous assembly and a tear-open string combined with the cellophane wrapper. The metal foil and the cellophane film are intended as vapor barriers for the preservation of said moisture content. Since the combined cost of these container materials has set a standard for the price of the complete package it is very essential not to increase the material cost of the improved container over the established levels because it may constitute a handicap of sufficient importance to discourage the widespread usage of the improved box. Consequently I propose a selection of the materials to be used in the manufacture of the box, i.e., of the blanks 40, 55, 60 and 70, which will preserve and perhaps increase the effectiveness of the protective values of the materials of the current package without any substantial increase in the cost of the container.

It shall be noted that a double barrier material is used for the pouch package because of the fragile character of the combined materials. Furthermore, when the exterior cellophane wrapper is cut through and the foil wrapper is broken to reach the contents the effectiveness of the protective materials is destroyed and a rapid loss of moisture content follows unless the cigarettes are quickly consumed. It will also be noted that the aforesaid container elements are only loosely wrapped around each other and therefore have only a remote reinforcing or stiffening effect in relation to each other.

I propose to use a medium weight paper board, approximately .012 to .015 inch thickness which may be a low-priced newsback chipboard or a sulphite to serve as the base element of structure. I propose to laminate a metallic foil on the interior or on the exterior of surface of said board. The printed design in the first instance would be contained on the exterior of the board which may be appropriately coated for that purpose. In the second instance the design may be provided on the foil exterior which may also be utilized to enhance the decorative effect of the design.

The cellophane wrapper, in addition to its protective service, also imparts a brilliance and gloss to the exterior of the pouch package. Consequently I propose an alternative combination wherein a moisture-proof plastic film such as cellophane or acetate or Pliofilm or any similar film is laminated onto the exterior face of said boxboard. The printed design may be applied to the exterior face of said board prior to lamination or to the film in accordance with individual preference or expediency. Thus the accustomed brilliance of the package will be preserved.

In both proposed combinations only a single ply of vapor barrier is employed which in these combinations shall equal the effectiveness of the double ply barriers of the pouch package. This effectiveness is obtained by integrating the barrier material with the base material and by means of the structural combination of the wall panels which combine with each other into a practically air-tight and contiguous exterior hull when the cover is closed. The non-contiguous portions at the side and front wall panels are as heretofore stated under a moderate pressure contact with each other of sufficient efficiency to prevent any essential loss. Furthermore, in this combination the need for the tear string or for an additional outer covering is eliminated. The box offers an effective protection not only during the interval of packaging and consumption but also during the period of consumption, thus increasing the benefits of preserved flavor during the entire period until the contents of the package are fully consumed.

The cost of the base board will be somewhat higher than the cost of the paper wrapper but the savings of the elements hereby eliminated more than compensate for that excess cost. In this manner my selection of materials and my proposed construction afford the replacement of the relatively inexpensive pouch package with the more firm box which not only offers a more substantial body protection to the cigarettes within but also the convenience of easy access to the contents and the additional benefit of prolonged moisture retainment.

What I claim is:

1. A partly fabricated blank for a hinged top collapsible folding box comprising a receptacle member and a pivotally joined cover member, said members having corresponding vertical wall panels in an overlaying relation when the cover is closed, said blank fabricated from a substantially rectangular single sheet of paper-board, and having designated thereon the respective receptacle and cover sections of said box in a vertical alignment, each section containing the said corresponding vertical wall panels designated by respective cut and crease lines, the said blank further comprising an intermediate neck wall section located between the aforesaid sections and being principally integrated with the receptacle wall panels, the said neck-wall being depressed by indenting below its normal plane to a depth approximating the thickness of said paper-board.

2. A partly fabricated blank for a hinged-top collapsible folding box comprising a receptacle member and a pivotally joined cover member, said members having corresponding vertical wall panels in an overlaying relation when the cover is closed, said blank fabricated from a substantially rectangular, single sheet of paper-board and having designated thereon the respective receptacle and cover sections of said box in a vertical alignment, each of the said sections containing the said vertical wall panels designated by respective cut and crease lines, the aforesaid sections being hingedly joined at a hinge line formed on one of said panels in such manner as to position the said cover panels into a superposed relation over the upper extremities of said receptacle panels, thereby concealing a corresponding portion of the latter, the said concealed portions being depressed by indenting below their normal plane to a depth of a single ply of said sheet of paper-board thereby allowing the exposed exterior faces of both panels to meet at an even plane.

3. A blank as set forth in claim 2 wherein the said sections are pivotally joined by means of an integrated connector extending between the said hinge line and the upper rim of the receptacle wall and being interfolded between said sections and adhesively secured to the exterior face of the receptacle wall.

4. A hinged top folding box collapsed into a tubular rectangular sleeve fabricated from a substantially rectangular, single sheet of paper-board, said box comprising a receptacle member and a pivotally joined cover member, each containing corresponding vertical wall panels and a glue panel designated by respective cut and crease lines in vertical alignment, said glue panel being adhesively joined with an opposite end panel to form said sleeve, the said members being hingedly joined on a hinge line formed on one of said panels in such a manner as to position the said cover panels into a superposed relation over the upper extremities of said receptacle panels, thereby concealing a corresponding portion of the latter, the said concealed portions being depressed by indenting below their normal plane to a depth of a single ply of said sheet of paper-board thereby allowing the exposed exterior faces of both panels to meet at an even plane.

5. A tubular rectangular sleeve as set forth in claim 4 wherein the said members are pivotally joined by means of an integrated connector extending from said hinge line to the upper rim of the receptacle wall and being interfolded between said members and adhesively secured to the exterior face of the receptacle wall.

6. A rectangular hinged-top collapsible folding box fabricated from a substantially rectangular, single sheet of paper-board comprising a receptacle member and a pivotally joined cover member, the said members having corresponding vertical wall panels and respective horizontal top and bottom panels, the said members being joined at a hinge line located below said top panel, the said vertical panels of said cover member extending from the said top panel only for a short distance below the said hinge line, whereby a corresponding portion of the receptacle walls are concealed when the cover is closed, the said concealed portions being inwardly depressed by indenting below their normal plane for a depth of a single ply of said sheet of paper board thereby allowing the exposed exterior faces of both panels to meet at an even plane when the cover is closed.

7. A rectangular hinged-top folding box as set forth in claim 6 wherein the said members are pivotally joined by means of an integral connector extending upwards from the hinge line of the cover to the top rim of the receptacle member and being interfolded between said members and adhesively secured to the exterior face of the receptacle wall.

8. A rectangular hinged-top collapsible folding box fabricated from a substantially rectangular, single sheet of paper-board comprising a receptacle member and a cover member, the said members having corresponding vertical wall panels in aligned relation and respective horizontal top and bottom panels, the said vertical panels of said cover member extending for a relatively short distance from said top panel and being disposed to overlap the upper extremities of the receptacle panels when the cover is closed, the said upper extremities being depressed by indenting to a depth of a single ply of said paper-board, whereby the said cover member forms an even plane with said receptacle member the said members being pivotally joined by means of a connector folded upwardly from the cover panels forming a hinge line and meeting the receptacle wall at a second fold line located at the upper rim of the receptacle member, the said connector being interfolded between said members and adhesively secured to the exterior face of the receptacle wall.

References Cited in the file of this patent

UNITED STATES PATENTS

| | | |
|---|---|---|
| 1,351,278 | Billstein | Aug. 31, 1920 |
| 2,011,438 | Daller | Aug. 13, 1935 |
| 2,037,341 | Scandore | Apr. 14, 1936 |
| 2,049,680 | Adams | Aug. 4, 1936 |
| 2,163,828 | Chalmers | June 27, 1939 |
| 2,249,392 | Moore | July 15, 1941 |
| 2,396,150 | Bonville | Mar. 5, 1946 |
| 2,468,543 | Chalmers | Apr. 26, 1949 |
| 2,661,139 | Brooks | Dec. 1, 1953 |